(12) United States Patent
Meitinger et al.

(10) Patent No.: US 9,162,582 B2
(45) Date of Patent: Oct. 20, 2015

(54) METHOD FOR OPERATING A MOTOR VEHICLE

(75) Inventors: Karl-Heinz Meitinger, München (DE); Stefan Ullmann, München (DE)

(73) Assignee: AUDI AG, Ingolstadt (DE)

( * ) Notice: Subject to any disclaimer, the term of this patent is extended or adjusted under 35 U.S.C. 154(b) by 14 days.

(21) Appl. No.: 14/119,682

(22) PCT Filed: Feb. 28, 2012

(86) PCT No.: PCT/EP2012/000851
§ 371 (c)(1),
(2), (4) Date: Nov. 22, 2013

(87) PCT Pub. No.: WO2012/159686
PCT Pub. Date: Nov. 29, 2012

(65) Prior Publication Data
US 2014/0091919 A1    Apr. 3, 2014

(30) Foreign Application Priority Data
May 24, 2011    (DE) .......................... 10 2011 102 423

(51) Int. Cl.
*B60Q 1/00*     (2006.01)
*B60L 11/18*    (2006.01)
(Continued)

(52) U.S. Cl.
CPC ........... *B60L 11/1824* (2013.01); *B60L 11/005* (2013.01); *B60L 11/1862* (2013.01); *B60Q 1/00* (2013.01); *B60W 10/06* (2013.01);
(Continued)

(58) Field of Classification Search
USPC ........... 340/455; 307/44–48, 52, 59; 320/127, 320/14, 158, 159, 162, 163
See application file for complete search history.

(56) References Cited

U.S. PATENT DOCUMENTS 6,127,805 A    10/2000   Kikuchi et al.
6,170,587 B1 *  1/2001   Bullock ...................... 180/69.6
(Continued)

FOREIGN PATENT DOCUMENTS

CN    102036849 A    4/2011    ............. B60L 11/12
DE    199 03 082     8/2000
(Continued)

OTHER PUBLICATIONS

International Search Report issued by the European Patent Office in International Application PCT/EP2012/000851 on May 15, 2012.
(Continued)

*Primary Examiner* — Daryl Pope
(74) *Attorney, Agent, or Firm* — Henry M. Feiereisen LLC

(57) ABSTRACT

A method for operating a motor vehicle, including at least one electric motor connected to at least one rechargeable energy storage unit that stores electrical power, wherein the charging operation of the energy storage unit is carried out in such a way that a charging state limit that lies below the maximum charging state of the energy storage unit is not exceeded, wherein upon activation of at least one vehicle starting system, which is designed to automatically carry out a maximum acceleration of the motor vehicle from the standing position, the charging operation of the energy storage unit is carried out before the acceleration of the motor vehicle in such a way that the energy storage unit is charged up to a further charging state limit that lies above the first charging state limit and/or at least one further rechargeable energy storage unit is connected in series

18 Claims, 2 Drawing Sheets

(51) Int. Cl.

| | | |
|---|---|---|
| *B60W 10/06* | (2006.01) | |
| *B60W 10/08* | (2006.01) | |
| *B60W 10/26* | (2006.01) | |
| *B60W 20/00* | (2006.01) | |
| *B60W 30/18* | (2012.01) | |
| *B60W 50/14* | (2012.01) | |
| *B60L 11/00* | (2006.01) | |

(52) U.S. Cl.
CPC ............. *B60W 10/08* (2013.01); *B60W 10/26* (2013.01); *B60W 20/00* (2013.01); *B60W 30/18027* (2013.01); *B60W 50/14* (2013.01); *B60W 2710/244* (2013.01); *B60W 2720/106* (2013.01); *Y02T 10/6286* (2013.01); *Y02T 10/7005* (2013.01); *Y02T 10/705* (2013.01); *Y02T 10/7022* (2013.01); *Y02T 10/7044* (2013.01); *Y10S 903/903* (2013.01)

(56) References Cited

U.S. PATENT DOCUMENTS

| | | | |
|---|---|---|---|
| 6,868,318 | B1 | 3/2005 | Cawthorne et al. ....... H02J 7/00 |
| 7,829,229 | B1 | 11/2010 | Maier et al. |
| 8,038,573 | B2 | 10/2011 | Kozub et al. |
| 2009/0021218 | A1 | 1/2009 | Kelty et al. |
| 2009/0108803 | A1 | 4/2009 | Singarajan et al. ....... H02J 7/00 |
| 2009/0205890 | A1 | 8/2009 | Diegelmann et al. |
| 2009/0212626 | A1* | 8/2009 | Snyder et al. ................ 307/10.1 |

FOREIGN PATENT DOCUMENTS

| | | | |
|---|---|---|---|
| DE | 102007038172 | 3/2008 | |
| DE | 102007024471 | 11/2008 | |
| DE | 102008009568 | 8/2009 | |
| DE | 102009007294 | 8/2010 | |
| DE | 102009020178 | 11/2010 | |
| EP | 1 008 484 | 6/2000 | |
| EP | 1008484 A2 | 6/2000 | ............. B60L 11/12 |
| EP | 2 110 289 | 10/2009 | |
| EP | 2 110 289 a2 | 10/2009 | ............ B60W 20/00 |
| JP | 2010-519126 | 6/2010 | |
| JP | 2010-519126 A | 6/2010 | ............ B60W 10/26 |
| WO | WO 2008/064141 | 5/2008 | |
| WO | WO 2008/064141 A2 | 5/2008 | ............. B60L 11/18 |

OTHER PUBLICATIONS

Chinese Search Report issued in counterpart Chinese patent application No. 2012800250311 on Jul. 3, 2015.
English translation of Chinese Search Report issued in counterpart Chinese patent application No. 2012800250311 on Jul. 3, 2015.

* cited by examiner

METHOD FOR OPERATING A MOTOR VEHICLE

CROSS-REFERENCES TO RELATED APPLICATIONS

This application is the U.S. National Stage of International Application No. PCT/EP2012/000851, filed Feb. 28, 2012, which designated the United States and has been published as International Publication No. WO 2012/159686 and which claims the priority of German Patent Application, Ser. No. 10 2011 102 423.2, filed May 24, 2011, pursuant to 35 U.S.C. 119(a)-(d).

BACKGROUND OF THE INVENTION

The invention relates to a method for operating a motor vehicle including at least one electric motor which is connected to at least one rechargeable electric energy storage unit, wherein the charging operation of the energy storage unit occurs such that a charging state limit which is below the maximal charging state of the energy storage device is not exceeded.

Alternative drive systems of modern motor vehicles, which in addition to a convectional internal combustion engine include at least one electric motor as part of the drive unit or have at least one electric motor as exclusive drive unit are well known. The former are often referred to as so-called hybrid motor vehicles and the latter as pure electric motor vehicles. The amount of energy required for the operation of the respective electric motor is usually provided by at least one rechargeable energy storage unit, which is connected with the electric motor(s).

It is known to control the charging operation of corresponding rechargeable energy storage units so that a charging state limit, which is below the maximal charging state of the energy storage unit is not exceeded. Thus the charging operation of corresponding rechargeable energy storage units can for example be limited to a charging state of 80% of the maximal charging capacity of the respective energy storage unit. This allows increasing the service life of the respective energy storage unit.

Also known are vehicle start systems which are commonly known as "Launch Control" in motor vehicles, and which are configured far automatically effecting a maximal acceleration of the motor vehicle, which is in particular equipped with an automatic transmission, from standstill. Activating a corresponding vehicle start system effects automatic maximal acceleration of the motor vehicle from standstill to a predetermined or predeterminable target value such as a target speed, with the maximal acceleration being controlled via one or multiple control devices. Correspondingly, the motor vehicle can be accelerated from standstill for example with a maximal acceleration from 0 to 100 km/h. The activation of corresponding vehicle start systems causes a change of different parameters of the motor vehicle such as the transmission control or an anti-slip control (ASR).

In order to carry out an automated maximal accelerated starting of the motor vehicle, which is equipped with an electric motor which forms at least a part of the drive unit or forms the drive unit itself, the corresponding vehicle start systems are to date not adjusted to the potential of corresponding hybrid motor vehicles or pure electric vehicles.

SUMMARY OF THE INVENTION

The invention is thus based on the object to set forth an operating method for a motor vehicle with at least one electric motor which is connected with at least one rechargeable energy storage unit, which is improved with regard to carrying out a corresponding automated maximal accelerated start from the standstill.

The problem is solved according to the invention by a method of the aforementioned type which is characterized in that when activating at least one vehicle start system which is configured for automatically effecting a maximal acceleration of the motor vehicle from standstill, the charging operation of the energy storage unit prior to acceleration the motor vehicle occurs in such a manner that the energy storage unit is charged to a further charging state limit which is above the first charging state limit and/or at least one further rechargeable energy storage unit is connected in series.

The present invention is based on the idea to use the potential of the at least one energy storage unit which is assigned to the at least one electric motor of the vehicle, in particular within the scope of an activated vehicle start system.

For this, in a first embodiment of the method according to the invention, when activating the vehicle start system which is configured for automatically effecting a maximal acceleration of the motor vehicle from standstill, the charging operation of the energy storage unit is controlled prior to the acceleration of the motor vehicle such that the energy storage unit is charged up to a further charging state limit which lies above the first charging state limit. Here, the usual charging state of the energy storage unit can be increased for a short period of time for example from 80% of the maximal charging state to for example 90% of the maximal charging state. Of course, it is also conceivable to use the maximal charging state of the energy storage unit as the further charging state limit. Generally, the first and/or further charging state limits can be fixedly determined by the manufacturer, or they can be charging state limits that can be individually predetermined by a user.

The increase of the charging state in particular above the charging state limit of about 80% of the maximal charging state causes a significant voltage increase in many energy storage devices, which at the same time means an increase in power, i.e., in particular with regard to performance which is made available for the automatic acceleration of the motor vehicle. The concrete adjustment of corresponding charging state limits can depend on many parameters specific for the energy storage unit, wherein for example also operation safety aspects are taken into account.

The aforementioned common charging state limit of about 80% is only to be understood as an example. In principle, the usual charging state limit is defined specific for the energy storage unit or individually, i.e., it normally varies among different energy storage units, and can therefore lie in particular energy storage units also at about 75% or 85% of the maximal charging state. Correspondingly, the further charging state limit is also to be individually determined in dependence on the concrete construction of the energy storage unit.

Correspondingly, within the framework of this embodiment of the method according to the invention, the charging state of the at least one energy storage unit is increased to the further charging state limit after activating the vehicle start system, i.e., immediately prior to initiating the automated start or while the motor vehicle is still standing.

The motor vehicle is thus conditioned when activating the vehicle start system so that more power is already available to the motor vehicle prior to the actual acceleration, i.e., during operation with deactivated vehicle start system. Correspondingly, the motor vehicle can be accelerated from standstill with more power during the subsequent automatic maximal acceleration.

The actual acceleration process can further be initiated for example immediately upon reaching the further charging state limit if the driver has issued a corresponding start release or acceleration release and/or requested by a user after reaching the further charging state limit. Examples for a start or acceleration request include a short-time actuation of the gas pedal or a further control element or a voice input. Preferably, the reaching of the further charging state limit is outputted via an output means and made known to the driver. The output means relates for example to a visual display or the sounding of an acoustic signal.

A charging state limit of course also relates to defined, in particular closed, charging state intervals.

A further embodiment of the method according to the invention provides that when activating the vehicle start system, instead of increasing the charging state of the energy storage unit to the further charging state limit, at least one further rechargeable energy storage unit is connected in series.

This embodiment achieves the conditioning of the motor vehicle, i.e., the provision of additional power for the automatic maximal accelerated start from standstill to be effected by the vehicle start system, by connecting in series at least one further energy storage unit, which may be a support battery or the like. The connection in series of multiple corresponding energy storage units causes a voltage increase and thus an increase in power. Of course, the energy storage units which can be connected in series via a corresponding switching means or the like are selected with regard to their construction or charging state, with regard to a power increase of the energy storage units and thus also of the electric motor connected therewith.

In this embodiment according to the invention, the actual acceleration process can occur as the case may be immediately upon activation of the vehicle system without waiting period, because in this case only the at least one further energy storage unit is to be connected in series. It is not necessary in this case to wait until reaching the further charging state limit of the energy storage unit. As the case may be the actual acceleration process can of course also in this case be initiated by a corresponding user request or user input.

It is also conceivable to combine the described embodiments of the method according to the invention, i.e., when activating the vehicle start system, to charge the energy storage unit to the further charging state limit prior to acceleration of the motor vehicle and also to connect at least one further rechargeable energy storage unit in series.

In principle, the temporary increase of the charging state limit to the further charging state limit can for example also enable corresponding acceleration up to a higher target speed i.e., for example not to a target speed of 100 km/h but to a target speed 130 km/h. Thus the energy storage unit can perform the acceleration work for a longer period of time.

Of course, for carrying out the method according to the invention at least one appropriate control device is provided which in particular communicates with the energy storage unit and/or the vehicle start system and as the case may be further respective components of the motor vehicle such as a transmission control or an anti-slip control. When multiple corresponding control devices are required these of course also communicate with each other.

In a refinement of the invention, the charging operation of the at least one energy storage unit occurs when the vehicle start system is activated with a charge rate that is increased compared to the charging operation when the vehicle start system is deactivated. Correspondingly it is sought to reach the further charging state limit of the energy storage unit as fast as possible in order to keep the duration between activating the vehicle start system and actual acceleration process with the corresponding power increase caused by the additional charge of the energy storage unit as short as possible.

It is conceivable that the energy required for charging the at least one energy storage unit to the further charging state limit is generated by the at least one electric motor which is operated as generator and which is driven via an internal combustion engine of the motor vehicle. This embodiment of the method according to the invention relates to the operation of a hybrid motor vehicle, which beside a conventional internal combustion engine such as an Otto or diesel motor also has an electric motor, which serves at least as a part of the drive unit of the motor vehicle. The charge operation of the at least one energy storage unit is carried out correspondingly when activating the vehicle start system so that the internal combustion engine drives the electric motor intermittently or transiently as generator so that the energy storage unit is charged via the generator to the further charging state limit. After reaching the further charging state limit and in particular when carrying out the maximal accelerated start, the electric motor is of course used as drive means again for the motor vehicle.

It is also conceivable that the energy amount required to charge the at least one energy storage unit to the further charging state limit is generated by the at least one electric motor which is operated as generator and which is driven via at least one further electric motor of the motor vehicle. This embodiment of the method according to the invention is in particular applicable for pure electric motor vehicles. In contrast to the principle described above, in this case at least one further electric motor, which is in particular connected in series, serves for driving the electric motor which is operated as generator and which provides the energy amount required for charging the at least one energy storage unit to the further charging state limit. At least one separate energy storage unit is preferably assigned to the further or additional electric motor, which serves at the same time as support battery.

The energy amount required for charging the at least one energy storage unit to the further charging state limit can also be provided by at least one further energy storage unit, in particular a dual-layer capacitor. This embodiment of the method according to the invention is applicable to hybrid motor vehicles and also to pure electric motor vehicles. Here, the energy amount for charging the at least one energy storage unit to the further charging state limit is provided via at least one further energy storage unit which can also be referred to as support battery or the like. The two energy storage units are preferably connected via a DC/DC converter (DC voltage converter), i.e., when increasing the charging state limit of the actual energy storage unit, the energy provided via the additional energy storage unit is transferred by interposing a DC/DC converter.

Dual-layer capacitors, which are generally also referred to as "super caps", are characterized by a particularly high power density, rendering them particularly suitable to provide the energy amount required to charge the energy storage unit to the further charging state limit.

It is useful when the at least one further energy storage unit is charged in a recuperation mode. Here, the energy generated for example during braking of the motor vehicle can be converted into electric energy, stored in an energy storage unit, which correspondingly functions as intermediate storage device, and then used for charging the energy storage unit which is assigned to the drive unit.

In order to enable vehicle occupants to perceive the method according to the invention, it is conceivable that the actual charging state of the energy storage unit is configured so as to be visually and/or acoustically and/or haptically perceivable. For this, corresponding output means such as monitors, loudspeakers, vibration devices etc. are provided.

The present invention also relates to a motor vehicle in particular a hybrid motor vehicle or a pure electric motor vehicle including at least one electric motor, which is connected with at least one rechargeable energy storage unit which stores electric energy, and at least one vehicle start system which is configured for effecting a maximal acceleration of the motor vehicle from standstill. The motor vehicle is configured for carrying out the method according to the invention described above. Correspondingly, the power of the motor vehicle according to the invention is increased by charging the at least one energy storage unit to the further charging state limit or by connecting a further energy storage unit in series and the motor vehicle thus has an increased acceleration behavior when the vehicle start system is activated.

As mentioned, the motor vehicle according to the invention can generally be configured as hybrid motor vehicle including an internal combustion engine and at least one electric motor, or as pure electric motor vehicle including at least one electric motor, which forms the drive unit of the motor vehicle.

For the variant of a hybrid motor vehicle it is conceivable that the energy amount required for charging the at least one energy storage unit to the further charging state limit can be generated via the at least one electric motor, which is driven by the internal combustion engine and is operated as generator. In this variant the internal combustion engine is used to intermittently or transiently operate the electric motor as generator, i.e., for the charging operation of the energy storage unit to the further charging state limit.

In particular for the variant of the pure electric motor vehicle it is conceivable that the energy required for charging the at least one energy storage unit to the further charging state limit is generated by the at least one electric motor which is operated as generator and is driven via at least one further electric motor of the motor vehicle. Accordingly, the motor vehicle has in this case at least one further electric motor, as the case may be connected in series and driving the electric motor, which drives the electric motor that is intermittently operated as generator and that serves for charging the energy storage unit assigned to the drive unit of the motor vehicle. Thus, in this embodiment the motor vehicle according to the invention has at least one further energy storage unit which may be referred to as support battery and which drives the further or additional electric motor which drives the electric motor that serves as generator.

It is also possible that the energy required for charging the at least one energy storage unit to the further charging state limit can be provided by at least one additional energy storage unit in particular a dual-layer capacitor. Here, the energy amount required for increasing the power of the energy storage unit is provided via a further energy storage unit, which serves as intermediate storage device. Advantageously, the latter includes at least one dual-layer capacitor, which is characterized by a particularly high power density. The two energy storage units are preferably connected via a DC/DC converter (DC voltage converter), i.e., when the charging state limit of the actual energy storage unit is increased, the energy amount provided by the additional energy storage unit is transferred by connecting a DC/DC converter.

In a refinement of the invention it is provided that the motor vehicle has at least one output means via which the actual charging state of the energy storage unit during the charging operation to the further charging state limit is visually and/or acoustically and/or haptically perceivable for at least one vehicle occupant. The output means can for example be configured as monitor with a correspondingly graphically designed display which shows the charging state of the energy storage unit or the further measures taken after activating the vehicle start system. Of course a corresponding output means may also include loudspeaker or vibration devices provided on the steering wheel or on the seat.

Analogous to the method according to the invention, the respective charging state limits can be fixedly defined or may be individually predetermined.

The actual charging state limit which as the case may be can also be referred to as lower charging state limit, can be ca. 80% of the maximal charging state and the further charging state limit which as the case may be can also be referred to as upper charging state limit can be ca. 90% of the maximal charging state of the at least one energy storage unit. Of course, the upper charging state limit can also be 100% of the maximal charging state of the energy storage unit. The values are only exemplary. As already mentioned with regard to the method according to the invention, the respective charging state limits are generally to be set in dependence on the concrete configuration of the energy storage unit.

BRIEF DESCRIPTION OF THE DRAWING

Further advantages, features and details of the invention become apparent from the exemplary embodiments described in the following and by way of the drawings. It is shown in.

DETAILED DESCRIPTION OF PREFERRED EMBODIMENTS

Figure 1:
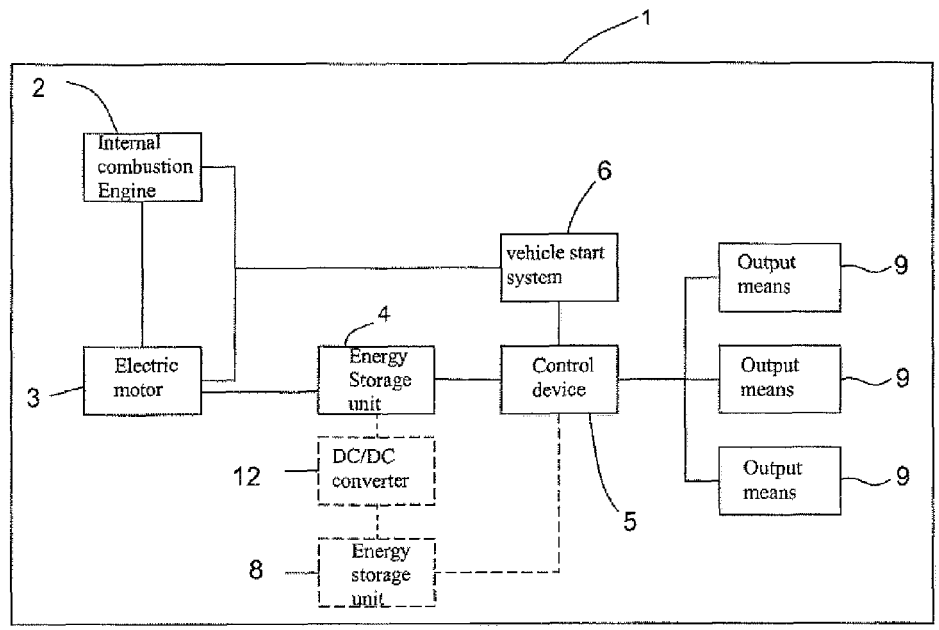
FIG. 1 a schematic representation of a motor vehicle according to the invention according to a first exemplary embodiment.

FIG. 1 shows a schematic representation of a motor vehicle 1 according to the invention according to a first exemplary embodiment. The motor vehicle 1 is a hybrid motor vehicle and includes as part of the drive train an internal combustion engine 2 as well as an electric motor 3, which together form the drive unit of the motor vehicle 1. The electric motor 3 is connected with a rechargeable energy storage unit 4, which stores electric energy. The energy storage unit can for example have multiple energy storage elements interconnected in series (not shown) in form of lithium-based cells. A control device 5 controls the charge operation of the energy storage unit 4 so that a charging state limit which lies below the maximal charging state of the energy storage unit and which in the following is referred to as lower charging state limit, of for example 80% of the maximal charging state of the energy storage unit 4 is not exceeded. In this way the service life of the energy storage unit 4 during normal operation of the motor vehicle 1 can be increased.

Further, the motor vehicle 1 includes a vehicle start system 6, which is configured for performing a maximal acceleration of the motor vehicle 1 from standstill. Corresponding vehicle start systems 6 are usually also referred to as "Launch Control" and allow when activated via an appropriate control element such as a button or the like, to accelerate a motor vehicle 1, in particular equipped with an automatic transmission, optimally in particular to a target value such as the maximal speed.

The method according to the invention provides that when activating the vehicle start system 6, the charging operation of the energy storage unit 4 occurs prior to the acceleration or respectively the start of the motor vehicle 1 so that the energy storage unit 4 is charged to a further charging state limit of the energy storage unit 4 which lies above the first charging state limit of the energy storage unit, hereinafter referred to as upper charging state limit of for example 90% of the maximal charging state of the energy storage unit 4.

The present invention is based on the idea that the voltage of the energy storage unit 4 and with this the power of electric motor 3 is significantly increased when charging above the lower charging state limit of 80%. Thus, by charging the energy storage unit 4 to the upper charging state limit, the motor vehicle can be started with a comparatively higher acceleration from standstill by means of the vehicle start system 6. Likewise, it is also conceivable to accelerate to higher target speeds so that as the case may be instead of accelerating to a target speed of 50 km/h it can be accelerated to a higher target speed of 70 km/h. The latter variant is in particular advantageous for comparatively smaller energy storage units 4.

Overall, the potential of the energy storage unit 4 or respectively the electric motor 3 is significantly increased or used more efficiently over the entire acceleration of the motor vehicle 1 to be performed due to the increased voltage level of the energy storage unit 4.

When activating the vehicle start system 6, the motor vehicle 1 is correspondingly conditioned so as to perform the automatic acceleration process with an optimal and greatest possible acceleration. Hereby it is useful when the charging process of the energy storage unit 4 occurs at a higher charge rate (charge speed) when the vehicle start system 6 is activated compared to when the vehicle start system 6 is deactivated. A corresponding control of the charge rate, i.e., in particular the setting of a maximal charge rate occurs for example also via the control device 5.

The actual start or respectively acceleration process occurs for example as soon as the energy storage unit 4 is charged to the upper charging state limit and a user release was given via a corresponding input by the user so that a controlled start of the motor vehicle 1 is ensured.

In this embodiment according to the invention, the energy amount required for charging the energy storage unit 4 to the upper charging state limit is generated in that the electric motor 3 is intermittently or transiently operated as generator and in this way used for charging the energy storage unit 4 to the upper charging state limit. Hereby, the electric motor 3 is driven via the internal combustion engine 2. After reaching the upper change state limit of the energy storage unit 4 and when performing the automatic start by the vehicle start system 6, the electric motor 3 serves for driving the motor vehicle 1 again.

As an alternative to operating the electric motor 3 as generator, the energy amount required for charging the energy storage unit 4 to the upper charging state limit can also be provided by way of an additional energy storage unit 8 (dashed line) in the form of a double layer capacitor. The energy storage unit 8 in the form of a double layer capacitor is preferably charged in the recuperation operation of the motor vehicle 1, i.e., the energy which for example is generated during braking of the motor vehicle is converted into electric energy and supplied to the further energy storage unit 8 in the sense of an intermediate storage device. Between the energy storage unit 4 and the additional energy storage unit 8 a DC/DC converter 12 is preferably connected. Using an energy storage unit 8, which is configured as dual-layer capacitor, allows realizing a corresponding increase of the voltage level of the energy storage unit 4 particularly fast.

The motor vehicle 1 also has corresponding output means 9 via which in particular the charging state or the charge process of the energy storage unit 4 to the upper charging state limit can be outputted. The output means 9 can for example be configured as monitor, loudspeaker or for example as a vibration unit provided on the steering wheel.

In principle, the lower and/or upper charging state limit can be predetermined by the manufacturer or for example be predetermined individually by a user.

Figure 2:
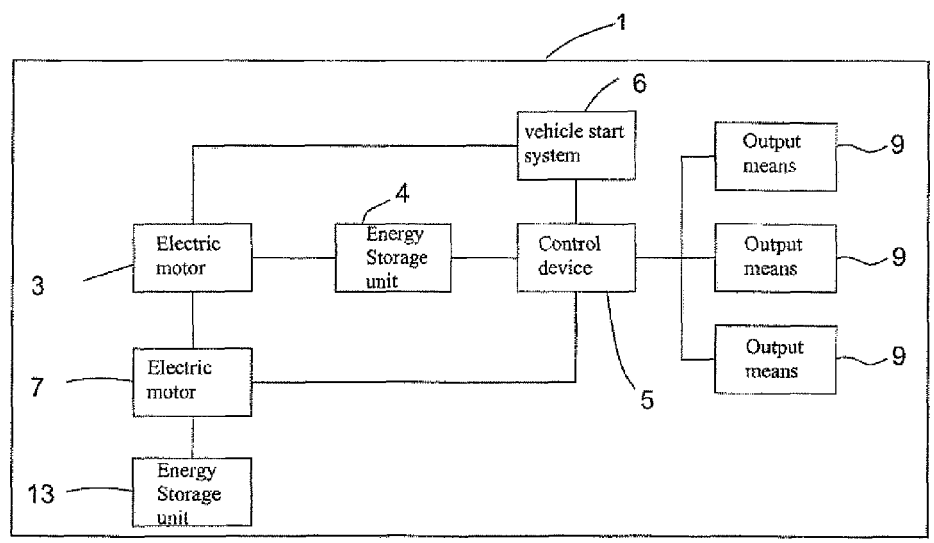
FIG. 2 a schematic representation of a motor vehicle according to the invention according to a second exemplary embodiment.

FIG. 2 shows a schematic representation of a motor vehicle 1 according to the invention according to a second exemplary embodiment. In contrast to the embodiment shown in FIG. 1, this is a pure electric motor vehicle.

For charging the energy storage unit 4 to the upper charging state limit it can be provided that the energy required for charging the energy storage unit 4 to the upper charging state limit is generated by the electric motor 3, which is operated as generator. The energy required for operating the electric motor 3 as generator is provided by at least one further electric motor 7 of the motor vehicle. Thus the electric motor 3, which is operated as generator, is driven by the further electric motor 7. A separate energy storage unit 13 is assigned to the electric motor 7, which is also preferably charged via a recuperation operation.

Figure 3:
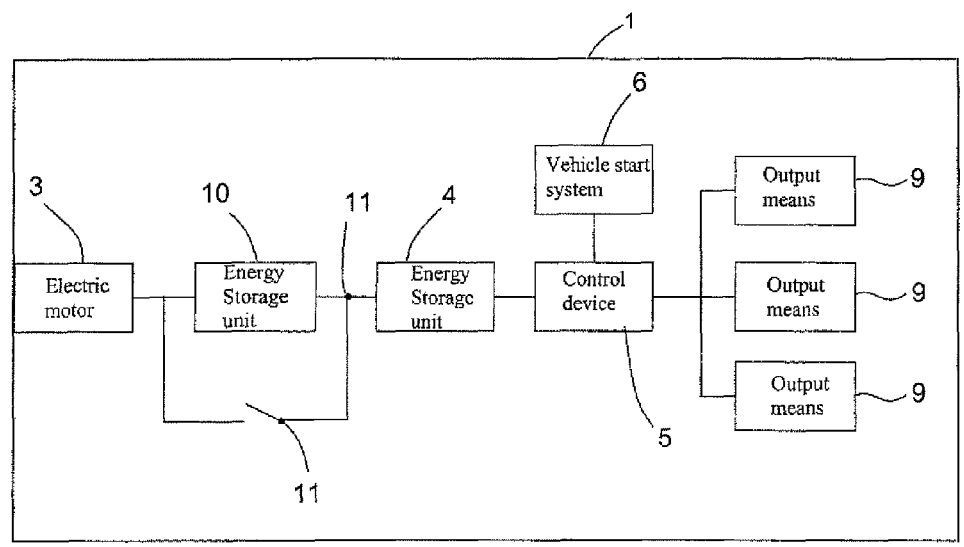
FIG. 3 a schematic representation of a motor vehicle according to the invention according to a second exemplary embodiment.

FIG. 3 shows a schematic representation of a motor vehicle 1 according to the invention in accordance with a third exemplary embodiment. Although in analogy to FIG. 2 the embodiment according to FIG. 3 shows a configuration of the motor vehicle according to the invention as pure electric motor vehicle it is also conceivable to apply the principle shown in FIG. 3 for example to a hybrid motor vehicle shown in FIG. 1.

The relevant difference to the embodiments shown in the FIGS. 1, 2 is that when activating the vehicle start system 6 via the control device 5, a further energy storage unit 10 is connected in series to the energy storage unit 3. Thus, during the automatic acceleration the voltage increase or power increase is realized by transiently connecting the energy storage units 3, 10 in series. The energy storage unit 10, which can also be referred to as support battery and is also preferably charged during the recuperation mode of the motor vehicle 1, is also connected if needed, i.e., when activating the vehicle start system 6. Of course, the energy storage units 3, 10 are adjusted to each other so that overall a power increase and with this an improved maximal acceleration of the motor vehicle 1 from standstill results. The connection of the energy storage unit 10 occurs via a corresponding control of the switching means provided therefor, in particular via the control device 5 or a further control device (not shown).

What is claimed is:

1. A method for operating a motor vehicle, said motor vehicle comprising a vehicle start system configured for maximal acceleration of the vehicle from standstill, at least one rechargeable energy storage unit storing electric energy, and at least one electric motor connected to the at least one energy storage unit, said method comprising:

in a deactivated state of the vehicle start system, charging the at least one rechargeable energy storage unit up to a first charging state limit, which is below a maximal charging state of the rechargeable energy storage unit; and in an activated state of the vehicle start system and prior to acceleration of the motor vehicle, charging the at least one rechargeable energy storage unit to a further charging state limit above the first charging state limit and/or connecting at least one further rechargeable energy storage unit in series, wherein an energy amount required for charging the at least one energy storage unit to the second charging state limit is generated by at least one of the least one electric motor operated as generator, and a further energy storage unit.

2. The method of claim 1, wherein the further energy storage unit is constructed as a dual-layer capacitor.

3. The method of claim 1, wherein the at least one electric motor is operated as generator by driving the at least one electric motor with a further electric motor of the motor vehicle.

4. The method of claim 1, wherein in the activated state of the vehicle start system, the at least one rechargeable energy storage unit is charged with a higher charging rate than when the vehicle start system is deactivated.

5. The method of claim 1, wherein the at least one electric motor is operated as generator by driving the at least one electric motor with an internal combustion engine of the motor vehicle.

6. The method of claim 1, wherein the at least one further energy storage unit is charged in a recuperation operation.

7. The method of claim 1, further comprising rendering an actual charging state of the energy storage unit during the charging to the further charging state limit visually and/or acoustically and/or haptically perceivable by at least one vehicle occupant.

8. The method of claim 1, wherein the first charging state limit and/or further charging state limit is a fixedly predetermined or individually predeterminable charging state limit.

9. The method of claim 1, wherein the first charging state limit corresponds to 80% of the maximal charging state of the energy storage unit and the further charging state limit corresponds to 90% of the maximal charging state of the at least one energy storage unit.

10. A motor vehicle, comprising:
at least one electric motor;
at least one rechargeable energy storage unit storing electric energy and connected to the at least one electric motor; and
at least one vehicle start system which is configured for effecting a maximal acceleration of the motor vehicle from standstill characterized in that the motor vehicle is configured for carrying out the method of claim 1.

11. The motor vehicle of claim 10, constructed as hybrid motor vehicle and further comprising an internal combustion engine, wherein the energy amount required for charging the at least one rechargeable energy storage unit to the further charging state limit is generated by the electric motor which is operated as generator and is driven by the internal combustion engine.

12. The motor vehicle of claim 10, constructed as hybrid vehicle and further comprising an internal combustion engine, and at least one further electric motor for driving the at least one electric motor and operating the at least one electric motor as generator, thereby providing the energy amount required for charging the at least one rechargeable energy storage unit to the further charging state limit.

13. The motor vehicle of claim 10 constructed as electric vehicle and further comprising a further electric motor for driving the at least one electric motor and operating the at least one electric motor as generator, thereby providing the energy amount required for charging the at least one rechargeable energy storage unit to the further charging state limit.

14. The motor vehicle of claim 10, constructed as electric vehicle and further comprising at least one further energy storage unit, for providing the energy amount required for charging the at least one energy storage unit to the further charging state limit.

15. The motor vehicle of claim 14, wherein the at least one further energy storage unit is constructed as dual layer capacitor.

16. The motor vehicle of claim 10, further comprising at least one output means constructed rendering an actual charging state of the at least one rechargeable energy storage unit during the charging to the further charging state limit visually and/or acoustically and/or haptically perceivable.

17. The motor vehicle of claim 10, wherein the first and/or the further charging state limit is fixedly predetermined or individually predeterminable.

18. The motor vehicle of claim 10, wherein the first charging state limit is 80% of the maximal charging state and the further charging state limit is 90% of the maximal charging state of the at least one researchable energy storage unit.

* * * * *